United States Patent
Puthawala et al.

(10) Patent No.: US 6,928,134 B1
(45) Date of Patent: Aug. 9, 2005

(54) APPARATUS FOR ADMITTING GAS INTO THE PRIMARY COOLANT OF A PRESSURIZED WATER REACTOR

(75) Inventors: Anwer Puthawala, Buckenhof (DE); Helmut Stünkel, Erlangen (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 09/050,651

(22) Filed: Mar. 30, 1998

Related U.S. Application Data

(63) Continuation of application No. PCT/EP96/04057, filed on Sep. 16, 1996.

(30) Foreign Application Priority Data

Sep. 29, 1995 (DE) .......................................... 195 36 450

(51) Int. Cl.[7] ................................................. G21C 9/00
(52) U.S. Cl. ........................ 376/306; 376/310; 376/309; 376/368
(58) Field of Search ................................ 376/302, 310, 376/373, 424, 368

(56) References Cited

U.S. PATENT DOCUMENTS

| | | | |
|---|---|---|---|
| 3,975,170 A | | 8/1976 | Keating, Jr. .................... 55/16 |
| 4,282,062 A | * | 8/1981 | Stiefel et al. ................ 376/306 |
| 4,374,083 A | * | 2/1983 | Deinlein et al. ............ 376/306 |
| 4,410,486 A | * | 10/1983 | Schick et al. ................ 376/306 |

FOREIGN PATENT DOCUMENTS

| | | | |
|---|---|---|---|
| DE | 2828153 | 1/1980 | ................. 376/306 |
| DE | 2948297 C2 | 1/1985 | ................. 376/306 |
| EP | 0328408 A2 | 8/1989 | ................. 376/306 |
| FR | 2407554 | 5/1979 | ................. 376/306 |

* cited by examiner

Primary Examiner—Jack Keith
(74) Attorney, Agent, or Firm—Laurence A. Greenberg; Werner H. Stemer; Ralph E. Locher

(57) ABSTRACT

An apparatus admits gas into the primary coolant of a pressurized water nuclear reactor having a coolant loop for a liquid coolant, in particular water, to which hydrogen is to be added. The coolant loop preferably includes a volume control tank for the coolant as well as at least one high-pressure pump which admits coolant that has been extracted from the coolant loop back into the coolant loop again. An admission point for the hydrogen is located in a suction line on the suction side of the high-pressure pump. A measurement line on the pressure side of the high-pressure pump communicates with the volume control tank or with a dewatering system. A device for measuring the hydrogen content in the coolant is incorporated into the measurement line. The measuring device is connected through a control device to a control valve, with which the delivery of hydrogen to the admission point can be controlled. The gas admission apparatus assures a definite, precisely maintained hydrogen content in the coolant.

10 Claims, 1 Drawing Sheet

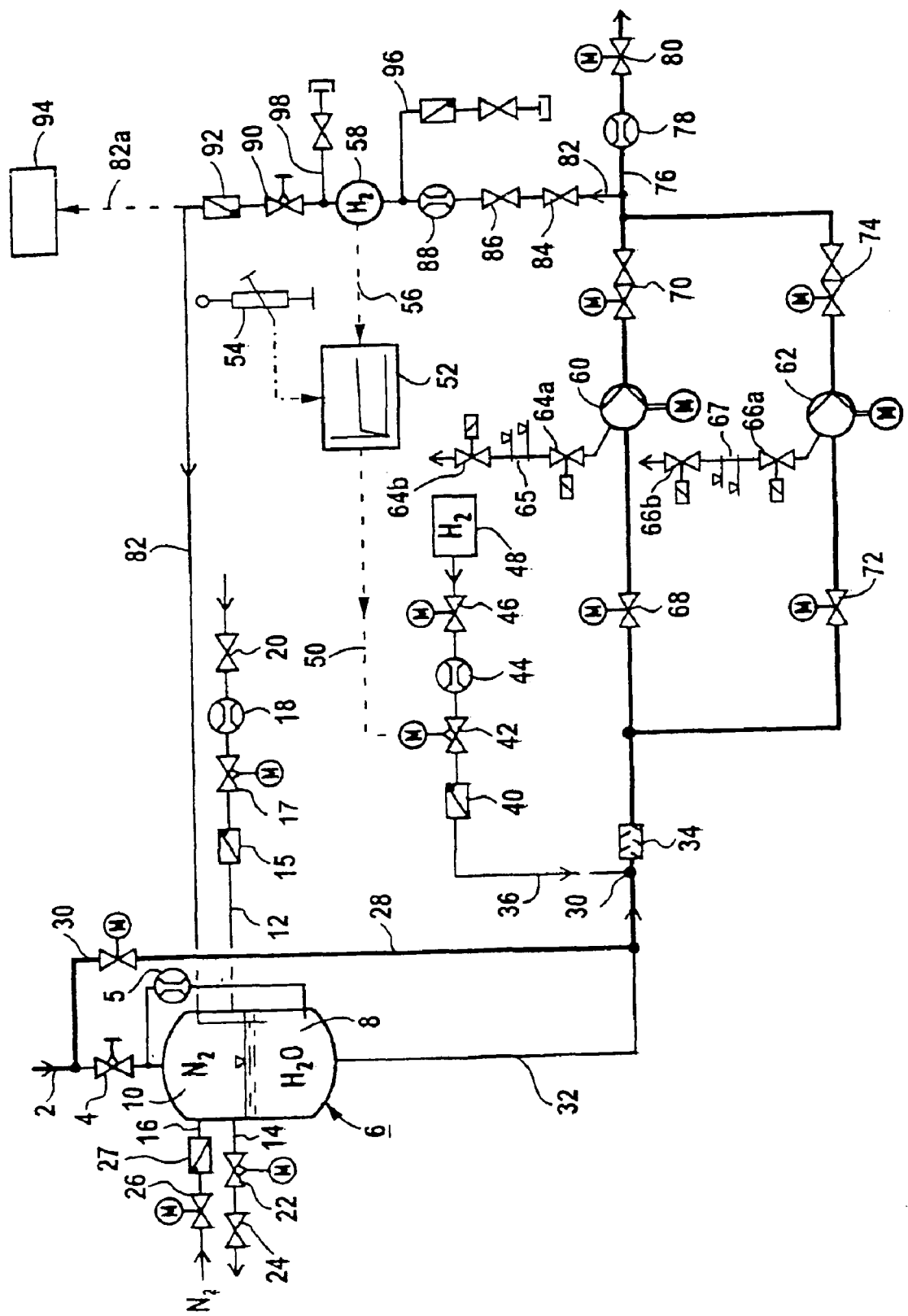

APPARATUS FOR ADMITTING GAS INTO THE PRIMARY COOLANT OF A PRESSURIZED WATER REACTOR

CROSS-REFERENCE TO RELATED APPLICATION

This application is a continuation of International Application Ser. No. PCT/EP96/04057, filed Sep. 16, 1996, which designated the United States.

BACKGROUND OF THE INVENTION

FIELD OF THE INVENTION

The invention relates to an apparatus for admitting gas into the liquid primary coolant of a pressurized water reactor with hydrogen, wherein the pressurized water reactor is equipped with a volume control tank and with at least one high-pressure pump disposed downstream.

A volume control system for the primary coolant of a pressurized water reactor is described in the book entitled VGB-Kernkraftwerks-Seminar 1970 (VGB Nuclear Power Plant Seminar 1970), especially on page 41. That system, through which some of the primary coolant constantly flows, also includes an apparatus for hydrogenation. The goal is to counteract radiolytic decomposition of the coolant in a central region of the nuclear reactor. In that known gas admission apparatus, the hydrogen is admitted into a volume control tank that is part of the volume control system. It is present there in form of a gas cushion above the surface of the liquid. The hydrogen partial pressure in the gas cushion is adjusted in accordance with the desired hydrogen concentration in the primary coolant.

The disadvantage of that gas admission apparatus is that if the volume control tank should leak, hydrogen will escape, which can lead to the development of oxyhydrogen gas with the risk of explosion. An attempt is therefore made to avoid hydrogen-filled gas spaces which are widespread in reactor technology, or at least to keep them as small as possible. Another disadvantage of that gas admission apparatus is that deviations in the hydrogen concentration of the primary coolant can only be reversed slowly, as compared with the hydrogen partial pressure prevailing in the gas cushion.

A further refinement of the aforementioned gas admission apparatus is known from German Published, Non-Prosecuted Patent Application DE 28 28 153, corresponding to U.S. Pat. Nos. 4,374,083 and 4,410,486. The hydrogenation of the primary coolant is performed there in a bypass line that is parallel to the volume control tank. A mixer and a gas separator are located downstream of the hydrogen admission point in that bypass-line, which discharges into the suction line between the volume control tank and three high-pressure pumps that operate in parallel. A hydrogen admission line with a control valve that is controlled by a control device leads to the admission point. The control device is supplied, in a manner which is not described in further detail, with the values for the hydrogen content of the coolant and for the operating state of the gas separator.

The disadvantage of that gas admission apparatus is that the hydrogen content of the primary coolant cannot be adjusted exactly. That is because the primary coolant, which is hydrogenated with gas in the bypass line, comes into contact in the suction line with primary coolant of a different hydrogen concentration arriving from the volume control tank and is mixed with it. Moreover, in the aforedescribed control concept there is necessarily a certain amount of gaseous hydrogen in the gas separator. The control concept is relatively complicated, and adjusting the hydrogen concentration takes a comparatively long time. The control device is moreover fairly expensive.

German Patent of Addition DE 29 48 297 C2 to the above-mentioned German Published, Non-Prosecuted Patent Application DE 28 28 153, corresponding to U.S. Pat. Nos. 4,374,083 and 4,410,486, develops the above-described gas admission apparatus further by providing that the hydrogen is conveyed in a liquid jet compressor, which uses the primary coolant as its liquid. That version, too, is burdened by the above-described disadvantages.

In a gas admission system which is known from French Patent Application 2 407 554, corresponding to U.S. Pat. No. 4,282,062, hydrogen is admitted directly into a high-pressure pump, for the sake of especially high precision in adjusting the hydrogen content.

SUMMARY OF THE INVENTION

It is accordingly an object of the invention to provide an apparatus for admitting gas into the primary coolant of a pressurized water reactor, which overcomes the hereinafore-mentioned disadvantages of the heretofore-known devices of this general type, in which a quantity of hydrogen located outside a volume of liquid in a volume control tank can be kept as small as possible and in which fast and exact adjustment of a hydrogen content in the coolant is assured in a relatively simple way.

With the foregoing and other objects in view there is provided, in accordance with the invention, in a pressurized water reactor optionally having a volume control tank and at least one high-pressure pump for liquid primary coolant, an apparatus for admitting gas into the liquid primary coolant with hydrogen, comprising a suction line leading to the at least one high-pressure pump; an admission point for feeding the hydrogen into the suction line; a hydrogen admission line leading to the admission point; a control device having an inlet side and an outlet side; a pressure line connected to the high-pressure pump; a measurement line branching off from the pressure line downstream of the at least one high-pressure pump; a measuring device incorporated into the measurement line and connected to the inlet side of the control device for measuring hydrogen concentration; and a control valve disposed in the hydrogen admission line and connected to the outlet side of the control device.

In accordance with another feature of the invention, the measurement line communicates with the volume control tank or with a dewatering system and is provided on the pressure side of the high-pressure pump. The device for measuring the hydrogen content in the coolant is incorporated into the measurement line. Since the rate of coolant extracted for measurement purposes from the pressure side of the high-pressure pump or high-pressure pumps, which is typically 5 to 15 liters per hour, is relatively slight, it is possible for this measurement line to communicate with the dewatering system of the nuclear reactor, as mentioned above.

In accordance with again another feature of the invention, the at least one high-pressure pump admits the primary coolant extracted from a coolant loop back into the coolant loop.

The apparatus according to the invention offers the advantage of permitting the hydrogen content in the coolant to be adjusted quickly and exactly. Idle spaces for hydrogen are reduced to a minimum. No gas separator is required.

As noted, the apparatus is connected to a control device for triggering the aforementioned control valve. In accordance with a further feature of the invention, the control valve is connected between a hydrogen supply and the admission point. This permits automatic operation of the hydrogen admission into the coolant.

In accordance with an added feature of the invention, there is provided a mixer downstream of the admission point. Since the premixing already takes place in the low-pressure portion, practically only dissolved hydrogen is present in the high-pressure portion.

In accordance with an additional feature of the invention, there is provided a bypass line assigned to the volume control tank. As a result, the volume control tank and thus the gas space in it can be kept small.

In accordance with yet another feature of the invention, the bypass line discharges upstream of the admission point into the suction line disposed between the volume control tank and the high-pressure pump. As a result, all of the coolant delivered to the high-pressure pump is brought to essentially a uniform hydrogen content.

In accordance with a concomitant feature of the invention, the control device is a proportional controller.

Other features which are considered as characteristic for the invention are set forth in the appended claims.

Although the invention is illustrated and described herein as embodied in an apparatus for admitting gas into the primary coolant of a pressurized water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a schematic circuit diagram of an embodiment of an apparatus according to the invention.

DESCRIPTION OF THE PREFERRED EMBODIMENTS

Referring now in detail to the single FIGURE of the drawing, there is seen an apparatus for admitting gas into the primary coolant of a pressurized water reactor. A line train 2 that branches off from a non-illustrated primary cooling loop of the pressurized water reactor leads through a manual control valve or a fixture 4 and a flow rate meter 5 into a lower portion of a volume control tank 6. The volume control tank 6 has a lower region 8 which is filled with a primary coolant, such as water ($H_2O$). A gas space 10 disposed above the primary coolant in the volume control tank 6 communicates through line trains 12, 14 with a non-illustrated exhaust gas system and through a supply line 16 with a nitrogen connection. The line train 12 contains a check valve 15, a control valve 17, a flow rate meter 18 and a fixture 20. They are components of a throughput control system for nitrogen that is known per se (see German Published, Non-Prosecuted Patent Application DE 28 28 153, corresponding to U.S. Pat. Nos. 4,374,083 and 4,410,486). The line train 14 contains a control valve 22 and a fixture 24. They are components of a pressure control system for nitrogen and possibly-present hydrogen that is known per se (see German Published, Non-Prosecuted Patent Application DE 28 28 153, corresponding to U.S. Pat. Nos. 4,374,083 and 4,410,486). The gas space 10 is substantially filled with nitrogen ($N_2$). Nitrogen ($N_2$) can be delivered through the supply line 16 and a valve 26 as well as a check valve 27.

A bypass line 28 which is parallel to the volume control tank 6 has a control valve 30. The bypass line 28 leads from the line train 2 to a suction line 32 connected at the bottom. The flow rate can be adjusted by a motor, using the control valve 30. A boron concentration replenishment is carried out in the volume control tank 6 with the aid of the control valve 30 and the fixture 4. The boron delivery takes place at an inlet to the line 2 and is not shown in further detail. A certain flow rate is diverted continuously from the main stream through the fixture 4 and is carried into the volume control tank 6, where after mixing with the contents thereof it is carried out again at the bottom through the line 32.

A static mixer 34 is provided in the suction line 32, downstream of the location where the bypass line 28 discharges into it. The static mixer 34 is used for mixing in $H_2$. A hydrogen admission or feed line 36 discharges into the suction line 32 at an admission or feed point 38 upstream of the mixer 34. The line 36 may also discharge into the mixer 34. The hydrogen admission line 36 has a check valve 40, a motor-actuatable adjusting device or control valve 42, a flow rate meter 44 and a hydrogen supply 48 that can be shut off through the use of a shutoff valve 46. The control valve 42 communicates over a trigger line 50 with a controller or control device 52 having an adjustable desired or set point value transducer 54. This is where the desired value for the desired hydrogen content can be set. The control device 52 communicates over a measurement line 56 with a measuring device 58 for hydrogen ($H_2$). This $H_2$ measuring device 58 may especially be a measuring device of the kind sold by Orbisphere Laboratories, CH-2000 Neuchatel, Switzerland.

Two high-pressure pumps 60, 62 which are provided downstream of the mixer 34, in parallel segments, have respective venting fixtures 64a, 64b and 66a, 66b, between which respective gas measuring devices 65 and 67 are disposed for ascertaining whether or not gas is present in the respective lines. If gas is detected, then the respective outer fixture 64b, 66b is opened and the inner fixture 64a, 66a is closed, so that the gas can escape. The pumps 60, 62 are incorporated between a first and a second valve 68 and 70 on one hand, and a third and a fourth valve 72 and 74 on the other hand. The high-pressure pumps 60, 62 for the most part return the primary coolant from the bypass line 28 back to the primary coolant loop, through a common pressure line 76, a flow rate meter 78 and a valve 80.

The disposition of the volume control tank 6 has the following purposes: First, it assures an equalization of fluctuations in the level of primary coolant on the suction side of the high-pressure pumps 60, 62. Second, it assures a coolant reserve (of 12.5 cbm, for example), if any non-illustrated fixture located upstream of the control valve 30 should by mistake block or interrupt the delivery of primary coolant to the high-pressure pumps 60, 62. These pumps 60, 62 must continue running at all times, for safety reasons.

A measurement or branch line 82 branches off from the pressure line. This measurement line 82 contains the following elements in succession: valves 84, 86, a flow rate meter 88, the measuring device 58 for on-line measurement of the hydrogen content in the primary coolant, a throttle device 90 and a check valve 92. The measurement line 82 then leads into the lower portion 8 of the volume control tank 6. As an alternative, it may also extend into the gas space 10, or into a dewatering system 94. This latter alternative is indicated by dashed line 82*a* in the drawing. Branches 96, 98 are also provided at the measuring device 58 for determining the dissolved hydrogen. These branches 96, 98 serve to recalibrate the measuring device 58 after a certain length of time in operation (with the aid of a non-illustrated hydrogen container), or to dewater or vent the measurement line 82 as needed.

Only a relatively low rate of coolant is diverted out of the pressure line 7.6 through the measurement line 82, such as 5 to 10 liters per hour. The diverted coolant is either fed back into the coolant course through the volume control tank 6, or diverted into the dewatering system 94.

The functional mode of the illustrated apparatus is as follows:

The adjustment of the hydrogenation into the primary coolant is carried out through the control valve 42, which is triggered by the control device 52, on the low-pressure side of the two high-pressure pumps 60, 62, that is to their suction side. The hydrogen admission takes place at the admission point 38. The controlled variable, namely the hydrogen content in the primary coolant (such as water), is conversely measured continuously on the pressure side of the two high-pressure pumps 60, 62 through the use of the measuring device 58 in the measurement line 82. The control device 58 has the task of keeping the hydrogen concentration in the primary coolant at the specified desired value, which may amount to 2.5 ppm, for example.

The apparatus shown in the drawing enables unequivocal gas admission, i.e. the establishment of a defined hydrogen concentration in the coolant (water). It is distinguished by a simple structure. Unnecessary gas spaces are avoided.

We claim:

1. In a pressurized water reactor having at least one high-pressure pump for liquid primary coolant, an apparatus for admitting gas into the liquid primary coolant with hydrogen, comprising:
   a) a suction line leading to the at least one high-pressure pump;
   b) an admission point for feeding the hydrogen into said suction line;
   c) a hydrogen admission line leading to said admission point;
   d) a control device having an inlet side and an outlet side;
   e) a pressure line connected to the high-pressure pump;
   f) a coolant conducting measurement line branching off from said pressure line downstream of the at least one high-pressure pump;
   g) a measuring device incorporated into said coolant conducting measurement line and connected to said inlet side of said control device for measuring hydrogen concentration; and
   h) a control valve disposed in said hydrogen admission line and connected to said outlet side of said control device.

2. The apparatus according to claim 1, including a volume control tank, said coolant conducting measurement line leading into said volume control tank.

3. The apparatus according to claim 1, including a dewatering system, said coolant conducting measurement line leading into said dewatering system.

4. The apparatus according to claim 1, wherein the at least one high-pressure pump admits the primary coolant extracted from a coolant loop back into the coolant loop.

5. The apparatus according to claim 1, including a hydrogen supply, said control valve disposed in said hydrogen admission line between said hydrogen supply and said admission point.

6. The apparatus according to claim 1, including a mixer disposed in said suction line.

7. The apparatus according to claim 6, wherein said mixer is disposed downstream of said admission point.

8. The apparatus according to claim 1, including a volume control tank, and a bypass line associated with said volume control tank and having a valve.

9. The apparatus according to claim 8, wherein said bypass line discharges upstream of said admission point into said suction line between said volume control tank and the at least one high-pressure pump.

10. The apparatus according to claim 1, wherein said control device is a proportional controller.

* * * * *